(12) United States Patent
Nishino et al.

(10) Patent No.: US 11,993,671 B2
(45) Date of Patent: May 28, 2024

(54) CHLOROPRENE/UNSATURATED NITRILE COPOLYMER, CHLOROPRENE/UNSATURATED NITRILE COPOLYMER COMPOSITION AND VULCANIZED MOLDED ARTICLE

(71) Applicant: DENKA COMPANY LIMITED, Tokyo (JP)

(72) Inventors: Wataru Nishino, Itoigawa (JP); Suguru Onuki, Itoigawa (JP); Atsunori Kondo, Itoigawa (JP); Yuhei Ishigaki, Itoigawa (JP); Naoki Kobayashi, Itoigawa (JP)

(73) Assignee: Denka Company Limited, Tokyo (JP)

( * ) Notice: Subject to any disclaimer, the term of this patent is extended or adjusted under 35 U.S.C. 154(b) by 525 days.

(21) Appl. No.: 17/291,347

(22) PCT Filed: Nov. 6, 2019

(86) PCT No.: PCT/JP2019/043551
§ 371 (c)(1),
(2) Date: May 5, 2021

(87) PCT Pub. No.: WO2020/095962
PCT Pub. Date: May 14, 2020

(65) Prior Publication Data
US 2021/0395422 A1    Dec. 23, 2021

(30) Foreign Application Priority Data

Nov. 9, 2018    (JP) ................................. 2018-211380

(51) Int. Cl.
*C08F 236/18*    (2006.01)
*C08F 220/44*    (2006.01)
*B29C 35/02*    (2006.01)

(52) U.S. Cl.
CPC .......... *C08F 236/18* (2013.01); *C08F 220/44* (2013.01); *B29C 35/02* (2013.01); *B29K 2011/00* (2013.01)

(58) Field of Classification Search
CPC ..... C08F 220/44; C08F 236/18; C08F 236/12
USPC ................................................. 526/295, 342
See application file for complete search history.

(56) References Cited

U.S. PATENT DOCUMENTS

2015/0203613 A1    7/2015  Sunada et al.

FOREIGN PATENT DOCUMENTS

| CN | 1128540    | A  | 8/1996  |          |
|----|------------|----|---------|----------|
| CN | 101263170  | A  | 9/2008  |          |
| CN | 103228679  | A  | 7/2013  |          |
| CN | 107406646  | A  | 11/2017 |          |
| CN | 112638966  | A  | 4/2021  |          |
| EP | 0754725    | A2 * | 1/1997 | ............. C08L 11/02 |
| EP | 3783040    | A1 | 2/2021  |          |
| EP | 3789413    | A1 | 3/2021  |          |
| EP | 3795625    | A1 | 3/2021  |          |
| JP | S46-043094 | B1 | 12/1971 |          |
| JP | S55-145715 | A  | 11/1980 |          |
| JP | S62-106933 | A  | 5/1987  |          |
| JP | H03-215536 | A  | 9/1991  |          |
| JP | H09-067471 | A  | 3/1997  |          |
| JP | 2009-191235| A  | 8/2009  |          |
| JP | 2011-122141| A  | 6/2011  |          |
| JP | 2012-082289| A  | 4/2012  |          |
| TW | 202019990  | A  | 6/2020  |          |
| WO | WO 95/04766| A1 | 2/1995  |          |
| WO | WO 99/41298| A1 | 8/1999  |          |
| WO | WO 2012/070347 | A1 | 5/2012 |        |
| WO | WO 2013/015043 | A1 | 1/2013 |        |
| WO | WO 2020/044899 | A1 * | 3/2020 | ............. C08L 11/00 |

OTHER PUBLICATIONS

Machine translation of JP 2009-191235A, published Aug. 2009, 6 pages; retrieved from ESPACENET on Nov. 22, 2023 (Year: 2009).*
State Intellectual Property Office, Notice of Allowance issued in Chinese Patent Application No. 201980070003.3 (Jul. 27, 2023).
International Bureau of WIPO, International Preliminary Report on Patentability in International Application No. PCT/JP2019/043551 (May 20, 2021).
Pin, Chang, "Kinetics of Catalyzed Isomerization Reaction of 4-Chlorobutadiene-1,2 to Chloroprene", *Acta Chimica Sinica*, vol. 26(3): pp. 117-123 (1960).
Makhiyanov, N., "Determination of the Microstructure of Polychloroprenes from $^1$H and $^{13}$C NMR Data", *Russian Journal of Applied Chemistry*, vol. 84(3): pp. 454-460 (2011).
State Intellecutal Property Office, Office Action issued in Chinese Patent Application No. 201980070003.3 (Feb. 14, 2023).
European Patent Office, Extended European Search Report in European Application No. 19882329.6 (Nov. 29, 2021).
Japanese Patent Office, International Search Report in International Patent Application No. PCT/JP2019/043551 (Dec. 17, 2019).
Taiwan Patent Office, Office Action issued in Taiwanese Patent Application No. 108140526 (May 2, 2023).

* cited by examiner

*Primary Examiner* — Fred M Teskin

(74) *Attorney, Agent, or Firm* — Leydig, Voit & Mayer, Ltd.

(57) ABSTRACT

A chloroprene-unsaturated nitrile copolymer having 3 to 20% by mass of a structural unit derived from an unsaturated nitrile monomer, in which the chloroprene-unsaturated nitrile copolymer has a peak at 5.80 to 6.00 ppm in a 1H-NMR spectrum as measured in a deuterochloroform solvent, and a ratio (A/B) of a peak area (A) at 5.80 to 6.00 ppm and a peak area (B) at 4.05 to 6.20 ppm is 0.6/100 to 1.1/100.

17 Claims, 1 Drawing Sheet

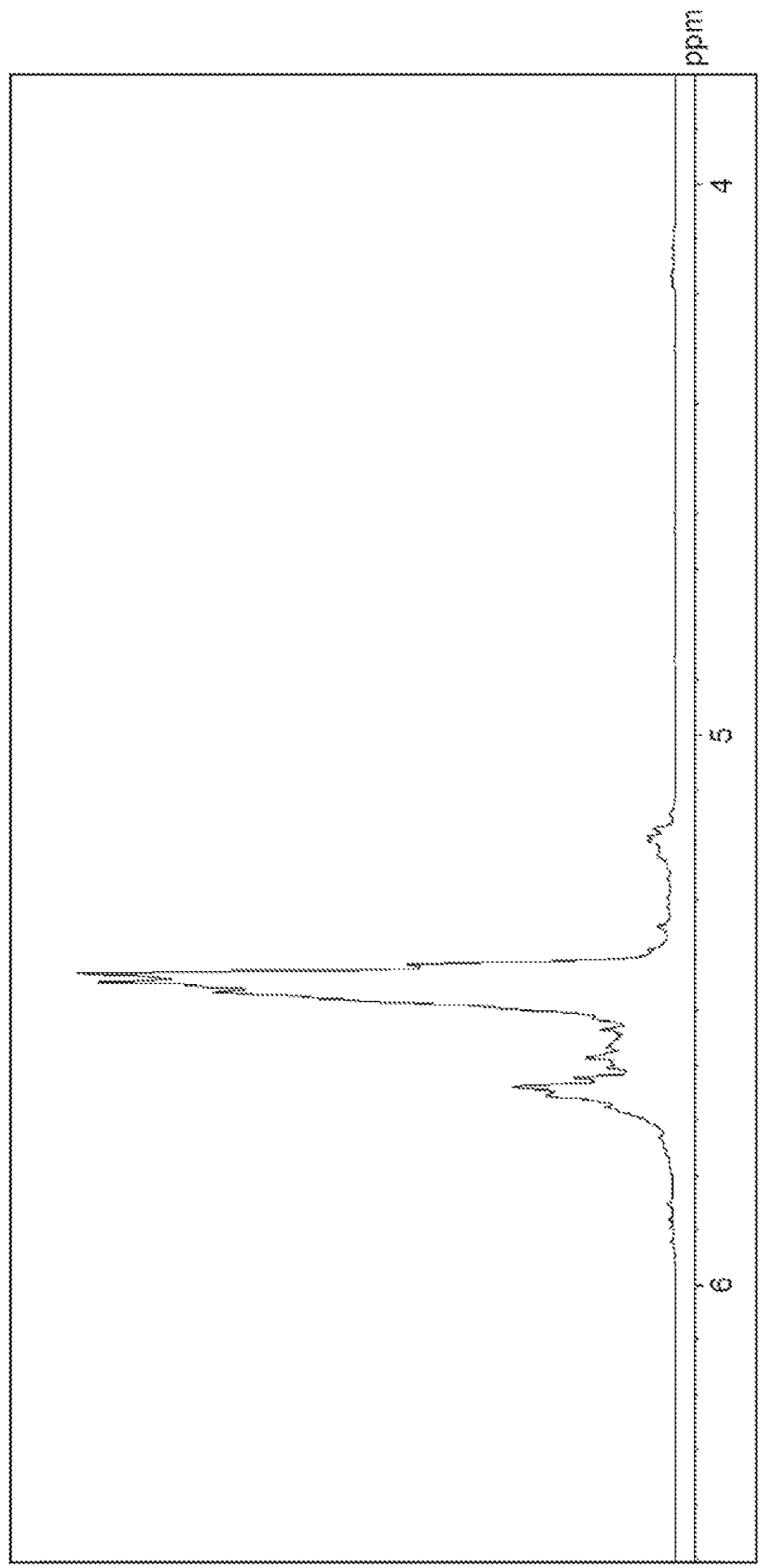

CHLOROPRENE/UNSATURATED NITRILE COPOLYMER, CHLOROPRENE/UNSATURATED NITRILE COPOLYMER COMPOSITION AND VULCANIZED MOLDED ARTICLE

CROSS-REFERENCE TO RELATED APPLICATIONS

This patent application is the U.S. national phase of International Application No. PCT/JP2019/043551, filed on Nov. 6, 2019, which claims the benefit of Japanese Patent Application No. 2018-211380, filed Nov. 9, 2018, the disclosures of which are incorporated herein by reference in their entireties for all purposes.

TECHNICAL FIELD

The present invention relates to a chloroprene-unsaturated nitrile copolymer, a chloroprene-unsaturated nitrile copolymer composition, and a vulcanized molded article.

BACKGROUND ART

Chloroprene rubbers are excellent in mechanical properties, flame resistance, and the like, and thus are widely used as materials for industrial rubber products. However, the chloroprene rubbers have problems that oil resistance is not sufficient and the chloroprene rubbers cannot be used in oily environments such as the periphery of engines. As means for improving the oil resistance of chloroprene rubbers, a method for producing a chloroprene copolymer copolymerized with an unsaturated nitrile monomer has been known (see, for example, Patent Literature 1 below). This copolymer is vulcanized and molded and is suitably used for products such as transmission belts, conveyor belts, hoses, and wipers (see, for example, Patent Literatures 2 and 3 below).

CITATION LIST

Patent Literature

Patent Literature 1: Japanese Unexamined Patent Publication No. S55-145715
Patent Literature 2: Japanese Unexamined Patent Publication No. 2012-82289
Patent Literature 3: International Publication WO 2013/015043

SUMMARY OF INVENTION

Technical Problem

An aspect of the present invention is intended to provide a chloroprene-unsaturated nitrile copolymer with which a vulcanized molded article excellent in breaking strength, oil resistance, fatigue durability, and cold resistance is obtained. Another aspect of the present invention is intended to provide a chloroprene-unsaturated nitrile copolymer composition containing this chloroprene-unsaturated nitrile copolymer. Still another aspect of the present invention is intended to provide a vulcanized molded article of the above-described chloroprene-unsaturated nitrile copolymer.

Solution to Problem

An aspect of the present invention provides a chloroprene-unsaturated nitrile copolymer having 3 to 20% by mass of a structural unit derived from an unsaturated nitrile monomer, in which the chloroprene-unsaturated nitrile copolymer has a peak at 5.80 to 6.00 ppm in a 1H-NMR spectrum as measured in a deuterochloroform solvent, and a ratio (A/B) of a peak area (A) at 5.80 to 6.00 ppm and a peak area (B) at 4.05 to 6.20 ppm is 0.6/100 to 1.1/100.

Another aspect of the present invention provides a chloroprene-unsaturated nitrile copolymer composition containing the aforementioned chloroprene-unsaturated nitrile copolymer.

Still another aspect of the present invention provides a vulcanized molded article of the aforementioned chloroprene-unsaturated nitrile copolymer.

Advantageous Effects of Invention

According to an aspect of the present invention, it is possible to provide a chloroprene-unsaturated nitrile copolymer with which a vulcanized molded article excellent in breaking strength, oil resistance, fatigue durability, and cold resistance is obtained. According to another aspect of the present invention, it is possible to provide a chloroprene-unsaturated nitrile copolymer composition containing this chloroprene-unsaturated nitrile copolymer. According to still another aspect of the present invention, it is possible to provide a vulcanized molded article of the aforementioned chloroprene-unsaturated nitrile copolymer. According to the chloroprene-unsaturated nitrile copolymer of the aspect of the present invention, a vulcanized molded article having excellent breaking strength, oil resistance, and fatigue durability in an evaluation method described in Examples can be obtained. According to the chloroprene-unsaturated nitrile copolymer of the aspect of the present invention, a vulcanized molded article having excellent cold resistance at 0° C. or lower in an evaluation method described in Examples can be obtained.

BRIEF DESCRIPTION OF DRAWINGS

The drawing is a view showing an example of a 1H-NMR spectrum.

DESCRIPTION OF EMBODIMENTS

Hereinafter, embodiments for carrying out the present invention will be specifically described. Note that, the present invention is not limited to embodiments described below.

In the present specification, a numerical range that has been indicated by use of "to" indicates the range that includes the numerical values which are described before and after "to", as the minimum value and the maximum value, respectively. In the numerical ranges that are described stepwise in the present specification, the upper limit value or the lower limit value of the numerical range of a certain stage can be arbitrarily combined with the upper limit value or the lower limit value of the numerical range of another stage. In the numerical ranges that are described in the present specification, the upper limit value or the lower limit value of the numerical value range may be replaced with the value shown in Examples. Materials listed as examples in the present specification can be used singly or in combinations of two or more kinds thereof, unless otherwise specified. In a case where a plurality of substances corresponding to each component exist in the composition, the content of each component in the composition means the total amount of the plurality of substances that exist in the composition, unless otherwise specified.

The term "peak" in an NMR spectrum refers to a convex inflection point in the NMR spectrum and also encompasses a shoulder shape as well as a peak showing a clear convex shape. In a case where there is a plurality of peaks in a range of a specific chemical shift (abscissa axis) in the NMR spectrum, the term "peak area" in this range refers to the total value of peak areas of the plurality of peaks.

<Chloroprene-Unsaturated Nitrile Copolymer>

A chloroprene-unsaturated nitrile copolymer of the present embodiment is obtained by copolymerizing a chloroprene monomer and an unsaturated nitrile monomer and has a structural unit derived from a chloroprene monomer (chloroprene monomer unit) and a structural unit derived from an unsaturated nitrile monomer (unsaturated nitrile monomer unit). The chloroprene-unsaturated nitrile copolymer of the present embodiment has 3 to 20% by mass of a structural unit derived from an unsaturated nitrile monomer and can have 3 to 20% by mass of the structural unit derived from the unsaturated nitrile monomer in the main chain, in the total amount of the chloroprene-unsaturated nitrile copolymer.

Examples of the unsaturated nitrile monomer include acrylonitrile, methacrylonitrile, ethacrylonitrile, and phenylacrylonitrile. The unsaturated nitrile monomer can be used alone or in combination of two or more kinds thereof. The unsaturated nitrile monomer preferably contains acrylonitrile from the viewpoint of easily obtaining excellent easiness of production and oil resistance.

The amount of the structural unit derived from the unsaturated nitrile monomer contained in the chloroprene-unsaturated nitrile copolymer is 3 to 20% by mass on the basis of the total amount of the chloroprene-unsaturated nitrile copolymer. When the amount of the structural unit derived from the unsaturated nitrile monomer is less than 3% by mass, the oil resistance of a vulcanized molded article to be obtained is not improved. When the amount of the structural unit derived from the unsaturated nitrile monomer is more than 20% by mass, the cold resistance of a vulcanized molded article to be obtained is deteriorated.

The amount of the structural unit derived from the unsaturated nitrile monomer is preferably 5% by mass or more, more preferably 7% by mass or more, further preferably 8% by mass or more, particularly preferably 9% by mass or more, and extremely preferably 10% by mass or more, from the viewpoint of easily obtaining excellent oil resistance. The amount of the structural unit derived from the unsaturated nitrile monomer is preferably less than 20% by mass, more preferably 17% by mass or less, further preferably 15% by mass or less, particularly preferably 15% by mass or less, extremely preferably 12% by mass or less, highly preferably less than 11% by mass, and even more preferably 10% by mass or less, from the viewpoint of easily obtaining excellent cold resistance. From these viewpoints, the amount of the structural unit derived from the unsaturated nitrile monomer is preferably 5 to 17% by mass and more preferably 9 to 17% by mass. The amount of the structural unit derived from the unsaturated nitrile monomer may be more than 10% by mass, 12% by mass or more, 15% by mass or more, 18% by mass or more, or 20% by mass or more. The amount of the structural unit derived from the unsaturated nitrile monomer may be less than 10% by mass, 8% by mass or less, 6% by mass or less, 5% by mass or less, or 4% by mass or less.

The amount of the structural unit derived from the unsaturated nitrile monomer contained in the chloroprene-unsaturated nitrile copolymer can be calculated from the content of the nitrogen atom in the copolymer. Specifically, the amount of the structural unit derived from the unsaturated nitrile monomer can be calculated by measuring the content of the nitrogen atom in 100 mg of the chloroprene-unsaturated nitrile copolymer using an element analysis apparatus (SUMIGRAPH 220F: manufactured by Sumika Chemical Analysis Service, Ltd.). The measurement of element analysis can be performed under the following conditions. For example, as for the electric furnace temperature, a reaction furnace, a reduction furnace, a column temperature, and a detector temperature are set at 900° C., 600° C., 70° C., and 100° C., respectively, oxygen is flowed as a combustion gas at 0.2 ml/min, and helium is flowed as a carrier gas at 80 ml/min. A calibration curve can be made using aspartic acid whose nitrogen content is known (10.52%) as a standard substance.

The amount of the structural unit derived from the chloroprene monomer is preferably in the following range on the basis of the total amount of the chloroprene-unsaturated nitrile copolymer. The amount of the structural unit derived from the chloroprene monomer is preferably 80% by mass or more, more preferably more than 80% by mass, further preferably 83% by mass or more, particularly preferably 85% by mass or more, extremely preferably 88% by mass or more, highly preferably more than 89% by mass, and even more preferably 90% by mass or more, from the viewpoint of easily obtaining excellent cold resistance. The amount of the structural unit derived from the chloroprene monomer is preferably 97% by mass or less, more preferably 95% by mass or less, further preferably 93% by mass or less, particularly preferably 92% by mass or less, extremely preferably 91% by mass or less, and highly preferably 90% by mass or less, from the viewpoint of easily obtaining excellent oil resistance. From these viewpoints, the amount of the structural unit derived from the chloroprene monomer is preferably 80 to 97% by mass. The amount of the structural unit derived from the chloroprene monomer may be less than 90% by mass, 88% by mass or less, 85% by mass or less, 82% by mass or less, or 80% by mass or less. The amount of the structural unit derived from the chloroprene monomer may be more than 90% by mass, 92% by mass or more, 94% by mass or more, 95% by mass or more, or 96% by mass or more. The amount of the structural unit derived from the chloroprene monomer can be obtained, for example, by subtracting the amount of the structural unit derived from the unsaturated nitrile monomer from the total amount of the chloroprene-unsaturated nitrile copolymer in a case where the chloroprene-unsaturated nitrile copolymer is constituted from the structural unit derived from the chloroprene monomer and the structural unit derived from the unsaturated nitrile monomer.

A monomer to be copolymerized with the chloroprene monomer is not limited to the unsaturated nitrile monomer. Examples of the monomer copolymerizable with the chloroprene monomer include 2,3-dichloro-1,3-butadiene, 1-chloro-1,3-butadiene, styrene, isoprene, butadiene, acrylic acid, esters of acrylic acid, methacrylic acid, and esters of methacrylic acid. The amount of the structural unit derived from 1-chloro-1,3-butadiene contained in the chloroprene-unsaturated nitrile copolymer may be less than 1% by mass on the basis of the total amount of the chloroprene-unsaturated nitrile copolymer.

The polymer structure of the chloroprene-unsaturated nitrile copolymer is not particularly limited, and may be a block copolymer or a statistical copolymer.

A statistical copolymer of the chloroprene monomer and the unsaturated nitrile monomer can be produced, for example, by performing continuous addition or 10 cycles or more of intermittent portionwise addition of the chloroprene monomer after initiation of a polymerization reaction. At this time, the amount of the chloroprene monomer to be added during time period dt(n+1) between time t(n) and time t(n+1) can be determined on the basis of the total quantity of polymerization conversion of the chloroprene monomer and the unsaturated nitrile monomer during time period dt(n) between time t(n−1) and time t(n) when the time at which the polymerization reaction is initiated is designated as t(0) and "n" is an integer of 1 or more, and the ratio of the unreacted chloroprene monomer and unsaturated nitrile monomer can be maintained to be constant.

The statistical copolymer means a copolymer which can be described on the basis of Bernoulli's statistic model or a primary or secondary Markov's statistic model as described in J. C. Randall "POLYMER SEQUENCE DETERMINATION, Carbon-13 NMR Method" Academic Press, New York, 1977, pages 71-78. In a case where the statistical copolymer of the chloroprene monomer and the unsaturated nitrile monomer is constituted from a binary system monomer, in terms of obtaining a statistical copolymer, it is preferable that, with regard to reactivity ratios r1 and r2 when assuming that a ratio of the chloroprene monomer and the unsaturated nitrile monomer at the time of polymerization initiation as d[M1]/d[M2] in the following Mayo-Lewis Formula (I) and assuming that the chloroprene monomer as M1 defined in the following Mayo-Lewis Formula (I), r1 is in a range of 0.3 to 3000 and r2 is in a range of $10^{-5}$ to 3.0.

[Mathematical Formula 1]

$$\frac{d[M1]}{d[M2]} = \frac{[M1]}{[M2]} \times \frac{r_1[M1]+[M2]}{[M1]+r_2[M2]} \quad (I)$$

The chloroprene-unsaturated nitrile copolymer can be obtained, for example, by emulsion polymerization. A polymerization initiator used in the emulsion polymerization is not particularly limited, and a known polymerization initiator, which is generally used in the emulsion polymerization of the chloroprene monomer, can be used. Examples of the polymerization initiator include organic peroxides such as potassium persulfate, ammonium persulfate, sodium persulfate, hydrogen peroxide, and t-butyl hydroperoxide.

An emulsifier used in the emulsion polymerization is not particularly limited, and a known emulsifier, which is generally used in the emulsion polymerization of the chloroprene monomer, can be used. Examples of the emulsifier include alkali metal salts of saturated or unsaturated aliphatic acids having 6 to 22 carbon atoms, alkali metal salts of rosin acids or disproportioned rosin acids (for example, potassium rosinate), and alkali metal salts of β-naphthalenesulfonic acid-formalin condensates (for example, sodium salt).

A molecular weight adjustor used in the emulsion polymerization is not particularly limited, and a known molecular weight adjustor, which is generally used in the emulsion polymerization of the chloroprene monomer, can be used. Examples of the molecular weight adjustor include long chain alkylmercaptans such as n-dodecylmercaptan, t-dodecylmercaptan, and n-octylmercaptan; xanthogen compounds such as diisopropylxanthogen disulfide and diethylxanthogen disulfide; iodoform; and thiocarbonyl compounds such as benzyl 1-pyrroldithiocarbamate (also known as benzyl 1-pyrrolcarbodithioate), benzylphenyl carbodithioate, 1-benzyl-N,N-dimethyl-4-aminodithiobenzoate, 1-benzyl-4-methoxydithiobenzoate, 1-phenylethylimidazole dithiocarbamate (also known as 1-phenylethylimidazole carbodithioate), benzyl-1-(2-pyrrolidinone)dithiocarbamate (also known as benzyl-1-(2-pyrrolidinone)carbodithioate), benzylphthalimidyl dithiocarbamate (also known as benzylphthalimidyl carbodithioate), 2-cyanoprop-2-yl-1-pyrroldithiocarbamate (also known as 2-cyanoprop-2-yl-1-pyrrolcarbodithioate), 2-cyanobut-2-yl-1-pyrroldithiocarbamate (also known as 2-cyanobut-2-yl-1-pyrrolcarbodithioate), benzyl-1-imidazole dithiocarbamate (also known as benzyl-1-imidazole carbodithioate), 2-cyanoprop-2-yl-N,N-dimethyl dithiocarbamate, benzyl-N,N-diethyl dithiocarbamate, cyanomethyl-1-(2-pyrrolidone)dithiocarbamate, 2-(ethoxycarbonylbenzyl)prop-2-yl-N,N-diethyl dithiocarbamate, 1-phenyl ethyl dithiobenzoate, 2-phenylprop-2-yldithiobenzoate, 1-aceto-1-yl-ethyl dithiobenzoate, 1-(4-methoxyphenyl)ethyl dithiobenzoate, benzyl dithioacetate, ethoxycarbonylmethyl dithioacetate, 2-(ethoxycarbonyl)prop-2-yldithiobenzoate, 2-cyanoprop-2-yldithiobenzoate, t-butyl dithiobenzoate, 2,4,4-trimethylpenta-2-yldithiobenzoate, 2-(4-chlorophenyl)-prop-2-yldithiobenzoate, 3-vinylbenzyl dithiobenzoate, 4-vinylbenzyl dithiobenzoate, benzyl diethoxyphosphinyl dithioformate, t-butyltrithioperbenzoate, 2-phenylprop-2-yl-4-chlorodithiobenzoate, naphthalene-1-carboxylic acid-1-methyl-1-phenyl-ethyl ester, 4-cyano-4-methyl-4-thiobenzyl sulfanyl butyric acid, dibenzyl tetrathioterephthalate, carboxymethyl dithiobenzoate, dithiobenzoate terminal-carrying poly(ethylene oxide), 4-cyano-4-methyl-4-thiobenzylsulfanyl butyrate terminal-carrying poly(ethylene oxide), 2-[(2-phenylethanethioyl)sulfanyl]propanoic acid, 2-[(2-phenylethanethioyl)sulfanyl]succinic acid, potassium 3,5-dimethyl-1H-pyrazol-1-carbodithioate, cyanomethyl-3,5-dimethyl-1H-pyrazol-1-carbodithioate, cyanomethyl methyl-(phenyl)dithiocarbamate, benzyl-4-chlorodithiobenzoate, phenyl methyl-4-chlorodithiobenzoate, 4-nitrobenzyl-4-chlorodithiobenzoate, phenyl prop-2-yl-4-chlorodithiobenzoate, 1-cyano-1-methyl ethyl-4-chlorodithiobenzoate, 3-chloro-2-butenyl-4-chlorodithiobenzoate, 2-chloro-2-butenyl dithiobenzoate, benzyl dithioacetate, 3-chloro-2-butenyl-1H-pyrrol-1-dithiocarboxylic acid, 2-cyanobutane-2-yl-4-chloro-3,5-dimethyl-1H-pyrazol-1-carbodithioate, cyanomethyl methyl(phenyl)carbamodithioate, 2-cyano-2-propyldodecyl trithiocarbonate, dibenzyl trithiocarbonate, butylbenzyl trithiocarbonate, 2-[[(butylthio)thioxomethyl]thio]propionic acid, 2-[[(dodecylthio)thioxomethyl]thio]propionic acid, 2-[[(butylthio)thioxomethyl]thio]succinic acid, 2-[[(dodecylthio)thioxomethyl]thio]succinic acid, 2-[[(dodecylthio)thioxomethyl]thio]-2-methyl propionic acid, 2,2'-[carbonothioylbis(thio)]bis[2-methyl propionic acid], 2-amino-1-methyl-2-oxoethylbutyl trithiocarbonate, benzyl-2-[(2-hydroxyethyl)amino]-1-methyl-2-oxoethyl trithiocarbonate, 3-[[[(t-butyl)thio]thioxomethyl]thio]propionic acid, cyanomethyldodecyl trithiocarbonate, diethylaminobenzyl trithiocarbonate, and dibutylaminobenzyl trithiocarbonate.

The polymerization temperature and the final conversion rate of the monomer are not particularly limited, and the polymerization temperature is preferably 0° C. to 50° C. and more preferably 10° C. to 50° C. It is preferable to perform polymerization such that the final conversion rate of the monomer falls within a range of 40 to 95% by mass. In order to adjust the final conversion rate, when the conversion rate becomes a desired value, a polymerization inhibitor for terminating the polymerization reaction may be added to terminate the polymerization.

A polymerization inhibitor is not particularly limited, and a known polymerization inhibitor, which is generally used in the emulsion polymerization of the chloroprene monomer, can be used. Examples of the polymerization inhibitor include phenothiazine (thiodiphenylamine), 4-tertiary-butylcatechol, and 2,2-methylenebis-4-methyl-6-tertiary-butylphenol.

The chloroprene-unsaturated nitrile copolymer can be obtained, for example, by removing the unreacted monomer by a steam stripping method, then adjusting the pH of the latex, and performing steps of freeze coagulation, washing with water, hot air drying, and the like of ordinary methods.

The chloroprene-unsaturated nitrile copolymer is classified into a mercaptan-modified type, a xanthogen-modified type, a sulfur-modified type, a dithiocarbonate-based type, a trithiocarbonate-based type, and a carbamate-based type, depending on the types of molecular weight adjustors.

The chloroprene-unsaturated nitrile copolymer has a peak (for example, a peak group) at 5.80 to 6.00 ppm in a 1H-NMR spectrum as measured in a deuterochloroform solvent. The chloroprene-unsaturated nitrile copolymer may have a peak (for example, a peak group) at 4.05 to 6.20 ppm in a 1H-NMR spectrum as measured in a deuterochloroform solvent. In the 1H-NMR spectrum of the chloroprene-unsaturated nitrile copolymer as measured in the deuterochloroform solvent, a peak area ratio (A/B) of a peak area (A) at 5.80 to 6.00 ppm and a peak area (B) at 4.05 to 6.20 ppm is 0.6/100 to 1.1/100. The drawing is a view showing an example of a 1H-NMR spectrum.

Herein, a peak (for example, a peak group) at 5.80 to 6.00 ppm are a peak derived from vinyl hydrogen of the 1,2-isomer of the chloroprene structural unit (chloroprene linking unit) in the chloroprene-unsaturated nitrile copolymer. The peak (for example, a peak group) at 4.05 to 6.20 ppm are the peak derived from vinyl hydrogen of the chloroprene structural unit (chloroprene linking unit) in the chloroprene-unsaturated nitrile copolymer. That is, the peak area ratio (A/B) of the peak area (A) at 5.80 to 6.00 ppm and the peak area (B) at 4.05 to 6.20 ppm of 0.6/100 to 1.1/100 indicates that 0.6/100 to 1.1/100 of the chloroprene structural unit (chloroprene linking unit) in the chloroprene-unsaturated nitrile copolymer is the 1,2-isomer.

When the peak area ratio (A/B) of the peak area (A) at 5.80 to 6.00 ppm and the peak area (B) at 4.05 to 6.20 ppm of the chloroprene-unsaturated nitrile copolymer is 0.6/100 to 1.1/100, the breaking strength and the fatigue durability (such as flex fatigue resistance) of a vulcanized molded article of the chloroprene-unsaturated nitrile copolymer can be improved. When the peak area ratio (A/B) is less than 0.6/100, the breaking strength of a vulcanized molded article of the chloroprene-unsaturated nitrile copolymer to be obtained is deteriorated. When the peak area ratio (A/B) is more than 1.1/100, an effect of improving the fatigue durability of a vulcanized molded article of the chloroprene-unsaturated nitrile copolymer to be obtained is not obtained. From the viewpoint of easily obtaining excellent fatigue durability, the peak area ratio (A/B) is preferably less than 1.1/100, more preferably 1.0/100 or less, further preferably 0.9/100 or less, particularly preferably 0.8/100 or less, and extremely preferably 0.7/100 or less. The peak area ratio (A/B) may be more than 0.6/100, 0.7/100 or more, 0.8/100 or more, 0.9/100 or more, 1.0/100 or more, or 1.1/100 or more.

In order to adjust the peak area ratio (A/B) of the peak area (A) at 5.80 to 6.00 ppm and the peak area (B) at 4.05 to 6.20 ppm of the chloroprene-unsaturated nitrile copolymer, the polymerization temperature when the chloroprene monomer and the unsaturated nitrile monomer are copolymerized may be adjusted, and for example, in order to increase this peak area ratio (A/B), the copolymerization may be performed by setting the polymerization temperature to preferably 30° C. to 50° C. and more preferably 40° C. to 50° C.

It is preferable that the chloroprene-unsaturated nitrile copolymer has a peak at 4.13 to 4.23 ppm in a 1H-NMR spectrum as measured in a deuterochloroform solvent, and a peak area ratio (C/B) of a peak area (C) at 4.13 to 4.23 ppm and a peak area (B) at 4.05 to 6.20 ppm is 0.03/100 to 0.5/100.

Herein, a peak (for example, a peak group) at 4.13 to 4.23 ppm are a peak derived from a structure in which water is added to the 1,2-isomer of the chloroprene structural unit (chloroprene linking unit) in the chloroprene-unsaturated nitrile copolymer. That is, the peak area ratio (C/B) of the peak area (C) at 4.13 to 4.23 ppm and the peak area (B) at 4.05 to 6.20 ppm indicates a ratio of the structure in which water is added to the 1,2-isomer of the chloroprene structural unit (chloroprene linking unit) in the chloroprene-unsaturated nitrile copolymer.

When the peak area ratio (C/B) of the peak area (C) at 4.13 to 4.23 ppm and the peak area (B) at 4.05 to 6.20 ppm of the chloroprene-unsaturated nitrile copolymer is 0.03/100 to 0.5/100, the fatigue durability can be improved without deterioration of the breaking strength of a vulcanized molded article of the chloroprene-unsaturated nitrile copolymer. The peak area ratio (C/B) may be more than 0.03/100, 0.05/100 or more, 0.1/100 or more, 0.2/100 or more, 0.3/100 or more, 0.4/100 or more, or 0.5/100 or more. The peak area ratio (C/B) may be less than 0.5/100, 0.4/100 or less, 0.3/100 or less, 0.2/100 or less, 0.1/100 or less, 0.05/100 or less, or 0.03/100 or less.

Since addition of water to the 1,2-isomer of the chloroprene linking unit is conducted by heating, in order to increase the peak area ratio (C/B) of the peak area (C) at 4.13 to 4.23 ppm and the peak area (B) at 4.05 to 6.20 ppm of the chloroprene-unsaturated nitrile copolymer, a chloroprene-unsaturated nitrile copolymer latex obtained by copolymerizing the chloroprene monomer and the unsaturated nitrile monomer may be heat-treated at 50° C. to 70° C. for 5 minutes to 10 hours. At this time, since the aforementioned peak area ratio (A/B) is decreased, a sufficient amount of the 1,2-isomer may be introduced into the chloroprene-unsaturated nitrile copolymer in advance.

The 1H-NMR spectrum can be measured as follows. The 1H-NMR spectrum can be measured in such a manner that the aforementioned chloroprene-unsaturated nitrile copolymer is refined with xylene and methanol and freeze-dried to obtain a sample, and then the sample is dissolved in deuterochloroform. The measurement data can be corrected on the basis of the peak (7.24 ppm) of chloroform in deuterochloroform used as a solvent.

<Chloroprene-Unsaturated Nitrile Copolymer Composition>

A chloroprene-unsaturated nitrile copolymer composition of the present embodiment contains the chloroprene-unsaturated nitrile copolymer of the present embodiment. The chloroprene-unsaturated nitrile copolymer composition of the present embodiment may be a vulcanizate of the chloroprene-unsaturated nitrile copolymer.

The content of the chloroprene-unsaturated nitrile copolymer in the chloroprene-unsaturated nitrile copolymer composition of the present embodiment may be in the following range on the basis of the total amount of the chloroprene-unsaturated nitrile copolymer composition. The content of the chloroprene-unsaturated nitrile copolymer may be 10% by mass or more, 20% by mass or more, 30% by mass or more, 40% by mass or more, or 45% by mass or more. The content of the chloroprene-unsaturated nitrile copolymer may be 90% by mass or less, 80% by mass or less, 70% by mass or less, 60% by mass or less, or 50% by mass or less. From these viewpoints, the content of the chloroprene-unsaturated nitrile copolymer may be 10 to 90% by mass.

The chloroprene-unsaturated nitrile copolymer composition of the present embodiment may contain additives other than the chloroprene-unsaturated nitrile copolymer. Examples of such additives include a vulcanizing agent, a plasticizer, an anti-aging agent, a filler, a vulcanization accelerator, a vulcanization rate adjustor, a processing aid, a softener, and an anti-scorching agent.

Examples of the vulcanizing agent include sulfur; a morpholine compound (such as dithiodimorpholine); elemental metals such as beryllium, magnesium, zinc, calcium, barium, germanium, titanium, tin, zirconium, antimony, vanadium, bismuth, molybdenum, tungsten, tellurium, selenium, iron, nickel, cobalt, and osmium, and oxides and hydroxides of these metals.

Examples of the plasticizer include an aromatic hydrocarbon-based plasticizer and dioctyl sebacate.

Examples of the anti-aging agent include an ozone anti-aging agent, a phenol-based anti-aging agent, an amine-based anti-aging agent, an acrylate-based anti-aging agent, an imidazole-based anti-aging agent, metal carbamates, waxes, and alkylated diphenylamine (for example, octylated diphenylamine).

Examples of the filler include carbon black, silica, clay, talc, calcium carbonate, and factice.

Examples of the vulcanization accelerator include a thiourea compound (such as ethylene thiourea or trimethyl thiourea); a guanidine compound; a thiuram compound; and a thiazole compound.

Examples of the vulcanization rate adjustor include tetramethylthiuram disulfide.

Examples of the processing aid include stearic acid.

<Molded Article and Vulcanized Molded Article>

A molded article of the present embodiment is a molded article of the chloroprene-unsaturated nitrile copolymer or the chloroprene-unsaturated nitrile copolymer composition of the present embodiment and can be obtained by mold processing the chloroprene-unsaturated nitrile copolymer or the chloroprene-unsaturated nitrile copolymer composition of the present embodiment into a shape suitable to purposes.

A vulcanized molded article of the present embodiment is a vulcanized molded article of the chloroprene-unsaturated nitrile copolymer or the chloroprene-unsaturated nitrile copolymer composition of the present embodiment. The vulcanized molded article of the present embodiment can be obtained by mold processing the chloroprene-unsaturated nitrile copolymer or the chloroprene-unsaturated nitrile copolymer composition of the present embodiment into a shape suitable to purposes and vulcanizing during molding or after molding, and can also be obtained by mold processing the vulcanizate of the present embodiment into a shape suitable to purposes.

The molding method is not particularly limited. For example, in a case where a molded article is a transmission belt, a conveyor belt, a hose, a wiper, or the like, the molded article can be formed by press molding, injection molding, extrusion molding, or the like. Since the chloroprene-unsaturated nitrile copolymer of the present embodiment is used, the vulcanized molded article is excellent in breaking strength, oil resistance, fatigue durability, and cold resistance.

The vulcanized molded article of the present embodiment can be used as a transmission belt, a conveyor belt, a hose, a wiper, a seal material (such as packing and gasket), a roll, an air spring, a vibration-proof material, an adhesive, a boot, a rubberized fabric, a sponge, a rubber lining, and the like. The chloroprene-unsaturated nitrile copolymer and the chloroprene-unsaturated nitrile copolymer composition of the present embodiment can be used for obtaining a vulcanized molded article to be used in these use applications. Since the vulcanized molded article of the present embodiment is excellent in breaking strength, oil resistance, fatigue durability, and cold resistance, this vulcanized molded article can be suitably used also in use applications which have been difficult when using a conventional chloroprene rubber (CR) or the like.

(Transmission Belt and Conveyor Belt)

A transmission belt and a conveyor belt are machine components used in a winding transmission device and are parts which transmit a motive power from a driving wheel to a driven wheel. The transmission belt and the conveyor belt are used frequently as being engaged with a pulley set to an axis. Since the transmission belt and the conveyor belt are excellent in light weight, quietness, freedom in changing axis angle, and the like, the transmission belt and the conveyor belt are used widely in all machines such as automobiles, belts for general industrial vehicles, and various conveyor belts. There is also a diversity in the types of belts, and transmission belts such as a plane belt, a timing belt, a V belt, a rib belt, and a round belt; conveyor belts; and the like are utilized differently on the basis of use applications to a machine. In order to efficiently transmit motive power, since a belt stretched under a high tension undergoes repetitive rotational deformation, elastomer materials such as natural rubber (NR), styrene butadiene rubber (SBR), CR, nitrile rubber (NBR), and hydrogenated nitrile rubber (HNBR) are used in conventional transmission belts and conveyor belts. Since CR has excellent rubber properties, CR is employed in automobiles, belts for general industrial vehicles, various conveyor belts, and the like, but it is still a never-ending technical problem to improve the mechanical strength in order to tolerate a high tension. Furthermore, a belt for a machine tool used on a site of construction, or the like is also used in an environment posing an exposure to scattered oils, and thus the belt is demanded to be improved in terms of the oil resistance. Further, since a belt is used continuously in a dynamic environment, a material having an excellent fatigue durability (such as flex fatigue resistance) is demanded in order to improve the reliability of a product.

The chloroprene-unsaturated nitrile copolymer of the present embodiment can enhance the breaking strength, the oil resistance, and the flex fatigue resistance of the transmission belt and the conveyor belt. Thereby, it is possible to produce a belt which can be used even in an environment posing an exposure to scattered oils, or the like, which has been difficult when using a conventional CR.

(Hose)

A hose is a bendable tube and is used in an operation (such as watering) requiring an ability of being bent freely, a portability and a mobility. Furthermore, since the hose is less likely to undergo fatigue fracture due to deformation as compared with a hard tube (such as a metal pipe), the hose is used in a piping at a vibrating position (such as an automobile piping). One of the most general hoses is a rubber hose. The rubber hose is made from NR, CR, EPDM (ethylene propylene diene rubber), SBR, NBR, ACM (acrylic rubber), AEM (ethylene acrylic rubber), HNBR, ECO (epichlorhydrin rubber), FKM (fluorine rubber), or the like, and examples thereof include a hose for water pumping, a hose for oil pumping, a hose for air pumping, a hose for vapor pumping, a hydraulic hose for high pressure, and a hydraulic hose for low pressure. While CR is used mainly in a hydraulic hose for high pressure because of its satisfactory mechanical strength enabling endurance against a high pressure of a fluid, because of its insufficient oil resistance, an inner layer is generally made from NBR. However, it is difficult to bond CR and NBR whose chemical structures are greatly different from each other, and when bonding is insufficient, a problem arises in that interfacial peeling occurs. Accordingly, a material having satisfactory mechanical strength and oil resistance is desired. Furthermore, the oil resistance of CR is insufficient as a hose which is brought into direct contact with a non-polar fluid, and thus improvement has been essential.

The chloroprene-unsaturated nitrile copolymer of the present embodiment can enhance the breaking strength and the oil resistance of the hose. Thereby, it is possible to produce a hose which is brought into direct contact with a non-polar fluid, which has been difficult when using a conventional CR.

(Wiper)

On a front glass, rear glass, and the like of an automobile, train, aircraft, ship, building machine, and the like, a wiper is usually provided in order to wipe off or remove rain drops, muddy water, oil stain, sea water, ice, snow, dust, and the like depositing on the surface to obtain a clear vision thereby securing safe driving. A wiper blade is fitted on the part where this wiper is brought into contact with the glass surface, and NR, CR, or the like is used as the conventional material for the wiper blade. Since CR has mechanical strength and fatigue durability against repetitive deformation and is excellent in terms of wipeability and the like, CR is used in automobile wipers. However, since the oil resistance of CR is insufficient, when the rubber material is swollen due to an oil stain, a problem arises in that wipeability is reduced. Accordingly, in an environment having substantial oil stains, a wiper blade having an excellent oil resistance has been demanded.

The chloroprene-unsaturated nitrile copolymer of the present embodiment can enhance the breaking strength, the oil resistance, and the fatigue durability of the wiper. Thereby, it is possible to produce a wiper which can be used even in an environment having substantial oil stains, which has been difficult when using a conventional CR.

(Seal Material)

A seal material is a part which prevents liquid or gas leakage and entry of rain water, rubbishes such as dust, or foreign substances into an inside in a machine, and plays an important role in maintaining the performance of the machine. Examples of the seal material include gaskets used for fixation and packings used at moving parts/movable parts. For the gasket whose seal member is fixed by a bolt and the like, various elastomers suitable to purposes are used as materials for soft gaskets such as O-rings or rubber sheets. Furthermore, the packing is used at an axis of a pump or motor, a rotating part such as a valve movable part, a reciprocal moving part such as a piston, a coupler connecting part, a water stop part of a water faucet, and the like. An oil seal used for sealing a hydraulic instrument at a relatively low pressure or a lubricant secures a sealability with the elasticity of an elastomer. In these elastomer seal materials, CR has a satisfactory mechanical strength and is used in a seal material for a polar gas or liquid. On the other hand, for use in a seal material for a non-polar fluid such as an engine oil or a gear oil, the oil resistance of CR is insufficient, and thus improvement has been essential.

The chloroprene-unsaturated nitrile copolymer of the present embodiment can enhance the breaking strength and the oil resistance of the seal material. Thereby, it is possible to produce a seal material for a non-polar fluid such as an engine oil or a gear oil, which has been difficult when using a conventional CR.

Examples of the seal material include engine head cover gasket, oil pan gasket, oil seal, lip seal packing, O-ring, transmission seal gasket, crankshaft, camshaft seal gasket, valve stem, power steering seal belt cover seal, a boot member for constant-velocity joint, a rack and pinion boot member, and diaphragm.

(Roll)

A roll is produced by subjecting a metal core such as an iron core to adhesive coating with a rubber, and generally produced by rolling a rubber sheet around a metallic iron core in a swirling pattern. In the roll, rubber materials such as NBR, EPDM, and CR are used depending on the required characteristics in various use applications such as papermaking, manufacture of various metals, printing, general industry, agricultural instruments such as a huller, and food processing. Since CR has a satisfactory mechanical strength capable of tolerating the friction caused by an article being transported, CR is used in a wide range of roll use applications. On the other hand, the oil resistance is insufficient for a roll which is used in an environment causing oil adhesion, such as production of industrial materials and products for steel manufacture or papermaking or the like, and improvement is demanded. Further, roll which transports a heavy article has a problem of deformation due to the load, which is demanded to be improved.

The chloroprene-unsaturated nitrile copolymer of the present embodiment can enhance the breaking strength or the like and the oil resistance of the roll. Thereby, it is possible to produce a roll which is used in an environment causing oil adhesion, which has been difficult when using a conventional CR.

(Air Spring)

An air spring is a spring device utilizing elasticity of compressed air. The air spring is used in air suspensions and the like for automobiles, buses, trucks, and the like. Examples of the air spring include a bellows type and a sleeve type (one of diaphragm types), and in any cases, the air spring causes a piston to be penetrated into the air chamber so that air pressure can be increased. The air spring is also used in an environment posing an exposure to scattered oils, and thus the air spring is demanded to be improved in terms of the oil resistance. Furthermore, since an air spring is used continuously in a dynamic environment, the air spring is demanded to have an excellent flex fatigue resistance in order to improve the reliability of a product.

The chloroprene-unsaturated nitrile copolymer of the present embodiment can enhance the breaking strength, the oil resistance, and the fatigue durability of the air spring. Thereby, it is possible to produce an air spring which can be used even in an environment having substantial oil stains, which has been difficult when using a conventional CR.

(Vibration-Proof Material)

A vibration-proof material is a rubber which prevents transfer and spreading of a vibration, and used, for example, in use applications for sound insulation or impact cushioning, and prevention of external spreading of a vibration generated from a machine, and the like. For example, the vibration-proof material is used as a constituent material of a torsional damper, an engine mount, a muffler hanger, and the like for absorbing the vibration upon engine drive and preventing noises in automobiles or various vehicles. While a natural rubber having excellent vibration-proof characteristics is widely used in the vibration-proof material, CR is used as a vibration-proof material used in an environment causing oil scattering, such as that for heavy equipment for construction. When the vibration-proof material is swollen as a result of adhesion of an oil, problems arise in that a mechanical strength is deteriorated and breaking easily occurs, which is demanded to be improved. Furthermore, since the vibration-proof material is used in a dynamic environment, durability against repetitive deformation is demanded to be improved.

The chloroprene-unsaturated nitrile copolymer of the present embodiment can enhance the breaking strength, the oil resistance, and the flex fatigue resistance of the vibration-proof material. Thereby, it is possible to produce a vibration-proof material (a vibration-proof rubber) which can be used even in an environment causing oil scattering, which has been difficult when using a conventional CR.

(Adhesive)

Since CR has contact performance and is excellent in initial adhesive strength, CR is utilized as an adhesive for a wide range of materials such as civil engineering and construction, plywood, furniture, shoes, wet suits, and automobile interior materials. Among these, since CR is excellent in initial adhesive strength and heat-resistant adhesion strength, CR is increasingly demanded to be used as a one-component adhesive for a polyurethane foam widely employed as a material for furniture or automobile interior materials. While the automobile interiors are required to be aesthetically satisfactory, since the oil resistance of CR is insufficient, when droplets of various oils or fuels used in the automobile and the like are adhered to an adherent, interfacial peeling or formation of curved surface of the adherent occurs. Accordingly, an adhesive material having a high oil resistance is desired.

The chloroprene-unsaturated nitrile copolymer of the present embodiment can enhance the breaking strength and the oil resistance of the adhesive. Thereby, it is possible to produce an adhesive which is more excellent than conventional CR.

(Boot)

A boot is a member in the form of bellows whose outer diameter gradually increases in the direction from one end to the other end, and examples include a boot for a constant-velocity joint cover, a boot for a ball joint cover (dust cover boot), and a boot for a rack and pinion gear, which are used for protecting drive parts of the automobile drive system and the like. Since the boot is required to have physical strength to tolerate a massive deformation, CR is used widely. Recently, since the space allowed for boot movement became smaller in response to advancement of technologies to achieve light weight and compactness of an automobile, the heat removal efficiency is lowered and the heat environment becomes severer. Accordingly, improvement in reliability against non-polar liquids such as oils and greases contained inside the boot under a high temperature atmosphere is desired.

The chloroprene-unsaturated nitrile copolymer of the present embodiment can enhance the breaking strength, the oil resistance, and the fatigue durability of the boot. Thereby, it is possible to produce a boot which is excellent in reliability against non-polar liquids such as oils and greases contained inside when compared with conventional CR.

(Rubberized Fabric)

A rubberized fabric is a composite material of a rubber and a woven fabric (fiber) made by pasting the rubber onto the fabric, has a strength greater than that of a rubber sheet, and is excellent in water resistance, air tightness, and the like. Utilizing these properties, the rubberized fabric is used widely in various use applications such as rubber boats, tent materials, clothes such as raincoats, water-proof sheets for building, and cushioning materials. As rubber material used in the rubberized fabric, CR, NBR, EPDM, and the like are generally used. Among these, since CR has excellent mechanical strength and weatherability, CR is used widely in fabrics used outdoor such as rubber boats. On the other hand, the oil resistance is insufficient for use in a rubberized fabric sheet material used in an environment where oils are scattered, such as automobiles and construction sites, and improvement is demanded.

The chloroprene-unsaturated nitrile copolymer of the present embodiment can enhance the breaking strength and the oil resistance of the rubberized fabric. Thereby, it is possible to produce a rubberized fabric which can be used even in an environment where oils are scattered, which has been difficult when using a conventional CR.

(Sponge)

A sponge is a porous material having voids of innumerable fine pores therein. A pore may be in both of the forms of an open cell and a closed cell. In a case where the pores are sufficiently large and continuous to each other, the sponge has a property of absorbing a liquid in a manner of replacement with air inside the pores when immersed in the liquid and has a property of easily releasing the liquid in response to an external force. Furthermore, in a case where the pores are small, the sponge can be used as an excellent cushioning material or heat insulating material. Since CR has excellent mechanical strength and rubber elasticity, CR is used widely in sponges, and used in vibration-proof materials, a sponge seal members, wetsuits, shoes, and the like. In any of such use applications, the oil resistance is demanded to be improved in order to prevent swelling deformation, discoloration, and the like due to oils.

The chloroprene-unsaturated nitrile copolymer of the present embodiment can enhance the breaking strength and the oil resistance of the sponge. Thereby, it is possible to produce a sponge which is less likely to undergo swelling deformation, discoloration, and the like due to oils, which has been difficult when using a conventional CR.

(Rubber Lining)

A rubber lining is used for anticorrosion of a metal by attaching a rubber sheet to a metal surface of a piping, a tank, or the like. Furthermore, the rubber lining is also used in a site requiring electricity resistance or abrasion resistance. NR, CR, EPDM, SBR, and the like are used as a conventional rubber lining, but the oil resistance may be insufficient, and thus the oil resistance is demanded to be improved.

The chloroprene-unsaturated nitrile copolymer of the present embodiment can enhance the oil resistance as the rubber lining. Thereby, anticorrosion of a piping or a tank due to oils can be achieved, which has been difficult when using a conventional rubber material.

EXAMPLES

Hereinafter, the present invention will be more specifically described on the basis of Examples. Note that, Examples described below are only typical examples of the present invention and the scope of the present invention is not restricted thereby at all.

<Production of Polymer>

(Polymer 1)

To a 3-L polymerization tank equipped with a heating/cooling jacket and a stirrer, 37 parts by mass of a chloroprene monomer, 37 parts by mass of an acrylonitrile monomer, 0.5 parts by mass of diethylxanthogen disulfide, 200 parts by mass of pure water, 5.00 parts by mass of potassium rosinate (manufactured by Harima Chemicals, Inc.), 0.40 parts by mass of sodium hydroxide, and 2.0 parts by mass of sodium salt of β-naphthalene sulfonic acid formalin condensate (manufactured by Kao Corporation) were added. Next, 0.1 parts by mass of potassium persulfate was added as a polymerization initiator, and then emulsion polymerization was performed under a nitrogen flow at a polymerization temperature of 20° C. Portionwise addition of the chloroprene monomer was started 20 seconds after polymerization initiation, and was continuously performed by adjusting the portionwise addition flow rate with an electromagnetic valve on the basis of the refrigerant calorimetric change for 10 seconds after polymerization initiation and thereafter by re-adjusting the flow rate every 10 seconds. At the time point when the polymerization rate with respect to the total amount of the chloroprene monomer and the acrylonitrile monomer became 50%, phenothiazine as a polymerization inhibitor was added to terminate the polymerization. Thereafter, by removing the unreacted monomer in the reaction solution under reduced pressure, a chloroprene-acrylonitrile copolymer latex was obtained.

The polymerization rate of the chloroprene-acrylonitrile copolymer latex was calculated from the dry mass of the air-dried chloroprene-acrylonitrile copolymer latex. Specifically, calculation was conducted by the Formula (II) below. In the formula, the solid concentration refers to the concentration [% by mass] of the solid fraction obtained by heating 2 g of the sampled chloroprene-acrylonitrile copolymer latex at 130° C. to remove volatile components such as the solvent (water), volatile chemicals, and the raw materials. The total input amount refers to the total amount of the raw materials, the reagents, and the solvent (water) which had been input into the polymerization tank from the polymerization initiation through a certain time. The non-evaporated residual fraction refers to the mass of the chemicals which did not evaporate under a condition of 130° C. and remained as a solid fraction together with the polymer, among the chemicals and the raw materials which had been input from the polymerization initiation through a certain time. The monomer input amount refers to the total amount of the monomer which was input initially to the polymerization tank and the monomer which was added portionwise from the polymerization initiation through a certain time. Note that, the "monomer" described herein refers to the total amount of the chloroprene monomer and the acrylonitrile monomer.

Polymerization rate [%]={(Total input amount [g]× Solid concentration [% by mass]/100)−(Non-evaporated residual fraction [g])}/Monomer input amount [g]×100 (II)

The aforementioned chloroprene-acrylonitrile copolymer latex was adjusted at pH 7.0, and freeze-coagulated on a metal plate cooled to −20° C. so as to be demulsified, thereby obtaining a sheet. This sheet was washed with water and dried for 15 minutes at 130° C., thereby obtaining a chloroprene-acrylonitrile copolymer (Polymer 1) in a solid form.

The amount of the structural unit derived from the acrylonitrile monomer contained in the chloroprene-acrylonitrile copolymer was calculated from the content of the nitrogen atom in the chloroprene-acrylonitrile copolymer. Specifically, the amount of the structural unit derived from the acrylonitrile monomer was calculated by measuring the content of the nitrogen atom in 100 mg of the chloroprene-acrylonitrile copolymer using an element analysis apparatus (SUMIGRAPH 220F: manufactured by Sumika Chemical Analysis Service, Ltd.). The measurement of element analysis was performed under the following conditions. As for the electric furnace temperature, a reaction furnace, a reduction furnace, a column temperature, and a detector temperature were set at 900° C., 600° C., 70° C., and 100° C., respectively, oxygen was flowed as a combustion gas at 0.2 ml/min, and helium was flowed as a carrier gas at 80 ml/min. A calibration curve was made using aspartic acid whose nitrogen content is known (10.52%) as a standard substance. The amount of the structural unit derived from the acrylonitrile monomer in the chloroprene-acrylonitrile copolymer was 10% by mass.

The aforementioned chloroprene-unsaturated nitrile copolymer was refined with xylene and methanol and freeze-dried again, thereby obtaining a sample. The sample was dissolved in deuterochloroform and then the 1H-NMR spectrum was measured. The measurement data were corrected on the basis of the peak (7.24 ppm) of chloroform in deuterochloroform used as a solvent. As a result of the measurement, the peak area ratio (A/B) of the peak area (A) at 5.80 to 6.00 ppm and the peak area (B) at 4.05 to 6.20 ppm of the chloroprene-acrylonitrile copolymer was 0.6/100 (0.6%) and the peak area ratio (C/B) of the peak area (C) at 4.13 to 4.23 ppm and the peak area (B) at 4.05 to 6.20 ppm was 0.01/100 (0.01%).

(Polymer 2)

A chloroprene-acrylonitrile copolymer (Polymer 2) was produced by the same procedures as in Polymer 1 mentioned above, except that the polymerization temperature was changed to 23° C. and heating was performed for 5 minutes at 60° C. after removing the unreacted monomer in the latex. When the amount of the structural unit derived from the acrylonitrile monomer in the chloroprene-acrylonitrile copolymer and the 1H-NMR spectrum were measured by the same procedures as in Polymer 1 mentioned above, the amount of the structural unit derived from the acrylonitrile monomer was 10% by mass, the peak area ratio (A/B) was 0.6/100 (0.6%), and the peak area ratio (C/B) was 0.03/100 (0.03%).

(Polymer 3)

A chloroprene-acrylonitrile copolymer (Polymer 3) was produced by the same procedures as in Polymer 1 mentioned above, except that the polymerization temperature was changed to 50° C. and heating was performed for 5 hours at 60° C. after removing the unreacted monomer in the latex. When the amount of the structural unit derived from the acrylonitrile monomer in the chloroprene-acrylonitrile copolymer and the 1H-NMR spectrum were measured by the same procedures as in Polymer 1 mentioned above, the amount of the structural unit derived from the acrylonitrile monomer was 10% by mass, the peak area ratio (A/B) was 0.6/100 (0.6%), and the peak area ratio (C/B) was 0.5/100 (0.5%).

(Polymer 4)

A chloroprene-acrylonitrile copolymer (Polymer 4) was produced by the same procedures as in Polymer 1 mentioned above, except that the polymerization temperature was changed to 50° C. When the amount of the structural unit derived from the acrylonitrile monomer in the chloroprene-acrylonitrile copolymer and the 1H-NMR spectrum were measured by the same procedures as in Polymer 1 mentioned above, the amount of the structural unit derived from the acrylonitrile monomer was 10% by mass, the peak area ratio (A/B) was 1.1/100 (1.1%), and the peak area ratio (C/B) was 0.01/100 (0.01%).

(Polymer 5)

A chloroprene-acrylonitrile copolymer (Polymer 5) was produced by the same procedures as in Polymer 1 mentioned above, except that the used amount of the added chloroprene monomer was changed to 47 parts by mass and the used amount of the acrylonitrile monomer was changed to 20 parts by mass. When the amount of the structural unit derived from the acrylonitrile monomer in the chloroprene-acrylonitrile copolymer and the 1H-NMR spectrum were measured by the same procedures as in Polymer 1 mentioned above, the amount of the structural unit derived from the acrylonitrile monomer was 3% by mass, the peak area ratio (A/B) was 0.6/100 (0.6%), and the peak area ratio (C/B) was 0.01/100 (0.01%).

(Polymer 6)

A chloroprene-acrylonitrile copolymer (Polymer 6) was produced by the same procedures as in Polymer 1 mentioned above, except that the used amount of the added chloroprene monomer was changed to 17 parts by mass and the used amount of the acrylonitrile monomer was changed to 50 parts by mass. When the amount of the structural unit derived from the acrylonitrile monomer in the chloroprene-acrylonitrile copolymer and the 1H-NMR spectrum were measured by the same procedures as in Polymer 1 mentioned above, the amount of the structural unit derived from the acrylonitrile monomer was 20% by mass, the peak area ratio (A/B) was 0.6/100 (0.6%), and the peak area ratio (C/B) was 0.01/100 (0.01%).

(Polymer 7)

A chloroprene polymer (Polymer 7) was produced by the same procedures as in Polymer 1 mentioned above, except that the used amount of the added chloroprene monomer was changed to 100 parts by mass, the used amount of the acrylonitrile monomer was changed to 0 parts by mass, and the chloroprene monomer was not added portionwise. When the amount of the structural unit derived from the acrylonitrile monomer in the chloroprene polymer thus obtained and the 1H-NMR spectrum were measured by the same procedures as in Polymer 1 mentioned above, the amount of the structural unit derived from the acrylonitrile monomer was 0% by mass, the peak area ratio (A/B) was 0.6/100 (0.6%), and the peak area ratio (C/B) was 0.01/100 (0.01%).

(Polymer 8)

A chloroprene-acrylonitrile copolymer (Polymer 8) was produced by the same procedures as in Polymer 1 mentioned above, except that the polymerization temperature was changed to 5° C. When the amount of the structural unit derived from the acrylonitrile monomer in the chloroprene-acrylonitrile copolymer and the 1H-NMR spectrum were measured by the same procedures as in Polymer 1 mentioned above, the amount of the structural unit derived from the acrylonitrile monomer was 10% by mass, the peak area ratio (A/B) was 0.5/100 (0.5%), and the peak area ratio (C/B) was 0.01/100 (0.01%).

(Polymer 9)

A chloroprene-acrylonitrile copolymer (Polymer 9) was produced by the same procedures as in Polymer 1 mentioned above, except that the polymerization temperature was changed to 55° C. When the amount of the structural unit derived from the acrylonitrile monomer in the chloroprene-acrylonitrile copolymer and the 1H-NMR spectrum were measured by the same procedures as in Polymer 1 mentioned above, the amount of the structural unit derived from the acrylonitrile monomer was 10% by mass, the peak area ratio (A/B) was 1.2/100 (1.2%), and the peak area ratio (C/B) was 0.01/100 (0.01%).

(Polymer 10)

A chloroprene-acrylonitrile copolymer (Polymer 10) was produced by the same procedures as in Polymer 1 mentioned above, except that the used amount of the added chloroprene monomer was changed to 50 parts by mass and the used amount of the acrylonitrile monomer was changed to 17 parts by mass. When the amount of the structural unit derived from the acrylonitrile monomer in the chloroprene-acrylonitrile copolymer and the 1H-NMR spectrum were measured by the same procedures as in Polymer 1 mentioned above, the amount of the structural unit derived from the acrylonitrile monomer was 2% by mass, the peak area ratio (A/B) was 0.6/100 (0.6%), and the peak area ratio (C/B) was 0.01/100 (0.01%).

(Polymer 11)

A chloroprene-acrylonitrile copolymer (Polymer 11) was produced by the same procedures as in Polymer 1 mentioned above, except that the used amount of the added chloroprene monomer was changed to 10 parts by mass and the used amount of the acrylonitrile monomer was changed to 57 parts by mass. When the amount of the structural unit derived from the acrylonitrile monomer in the chloroprene-acrylonitrile copolymer and the 1H-NMR spectrum were measured by the same procedures as in Polymer 1 mentioned above, the amount of the structural unit derived from the acrylonitrile monomer was 25% by mass, the peak area ratio (A/B) was 0.6/100 (0.6%), and the peak area ratio (C/B) was 0.01/100 (0.01%).

Experiment A: Evaluation of Polymer Composition (Production of Polymer Composition)

100 parts by mass of a polymer presented in Table 1, 0.6 parts by mass of ethylene thiourea (manufactured by Kawaguchi Chemical Industry Co., LTD., ACCEL 22S), 1.8 parts by mass of sulfur (commercialized product), 18 parts by mass of an aromatic hydrocarbon-based plasticizer (manufactured by New Japan Chemical Co., Ltd., NP-24), 2 parts by mass of wax (manufactured by OUCHI SHINKO CHEMICAL INDUSTRIAL CO., LTD., SUNNOC), 55 parts by mass of carbon black SRF (manufactured by Asahi Carbon Co., Ltd., Asahi #50), 15 parts by mass of factice (manufactured by TENMA FACTICE MFG. CO., LTD., Brown Factice), 4 parts by mass of magnesium oxide (manufactured by Kyowa Chemical Industry Co., Ltd., KYOWAMAG (registered trademark) 150), 5 parts by mass of zinc oxide (manufactured by SAKAI CHEMICAL INDUSTRY CO., LTD., Zinc Oxide No. 2), and 1 part by mass of an ozone anti-aging agent (manufactured by OUCHI SHINKO CHEMICAL INDUSTRIAL CO., LTD., NOCRAC 6C) were kneaded with an 8-inch open roll, thereby obtaining a polymer composition. In the table, "phr" means "part(s) by mass".

(Production of Vulcanized Molded Article)

The aforementioned polymer composition was subjected to press vulcanization under a condition of 160° C.×20 minutes to produce a sheet-shaped vulcanized molded article having a thickness of 2 mm.

(Evaluation of Vulcanized Molded Article)

The following evaluations were performed for the aforementioned vulcanized molded article. Evaluation results are presented in Table 1.

was 20% or more and less than 40% was evaluated as "B", and a case where the volume change rate was 40% or more was evaluated as "C". "A" or "B" was evaluated as "passing".

[Cold Resistance]

A Gehman's torsion test (T10) was measured according to JIS K6261 using the aforementioned vulcanized molded article. T10 refers to a temperature at which a torsional modulus is 10 times that at normal temperature (23° C.), and a smaller number indicates that cold resistance becomes satisfactory. A case where T10 was −10° C. or lower was evaluated as "A", a case where T10 was higher than −10° C. and 0° C. or lower was evaluated as "B", and a case where T10 was higher than 0° C. was evaluated as "C". "A" or "B" was evaluated as "passing".

TABLE 1

| | | | Example | | | | | | Comparative Example | | | | |
|---|---|---|---|---|---|---|---|---|---|---|---|---|---|
| | | Unit | A1 | A2 | A3 | A4 | A5 | A6 | A1 | A2 | A3 | A4 | A5 |
| Properties of Polymer | Polymer No. | — | 1 | 2 | 3 | 4 | 5 | 6 | 7 | 8 | 9 | 10 | 11 |
| | Amount of structural unit derived from unsaturated nitrile monomer | phr | 10 | 10 | 10 | 10 | 3 | 20 | 0 | 10 | 10 | 2 | 25 |
| | 1H-NMR peak area ratio (A/B) | % | 0.6 | 0.6 | 0.6 | 1.1 | 0.6 | 0.6 | 0.6 | 0.5 | 1.2 | 0.6 | 0.6 |
| | 1H-NMR peak area ratio (C/B) | % | 0.01 | 0.03 | 0.5 | 0.01 | 0.01 | 0.01 | 0.01 | 0.01 | 1.01 | 0.01 | 0.01 |
| Physical properties | Breaking strength | | B | B | B | A | B | A | A | C | A | B | A |
| | Fatigue durability | | B | A | A | C | C | B | C | B | D | B | C |
| | Oil resistance | | A | A | A | A | B | A | C | A | A | C | A |
| | Cold resistance | | A | A | A | A | A | B | A | A | A | A | C |

[Breaking Strength]

A test piece of a vulcanized sheet having a thickness of 2 mm was produced from the aforementioned vulcanized molded article. A tensile test was performed using this test piece on the basis of JIS K6251 and the tensile strength (unit: MPa) of the vulcanized rubber was measured. A case where the tensile strength was 20 MPa or more was evaluated as "A", a case where the tensile strength was 15 MPa or more and less than 20 MPa was evaluated as "B", and a case where the tensile strength was less than 15 MPa was evaluated as "C". "A" or "B" was evaluated as "passing".

[Fatigue Durability]

The fatigue durability (flex fatigue resistance) was evaluated by checking the number of times (unit: 10000 times) of flex test at the time point when cracks occurred under conditions of a stroke of 58 mm and a speed of 300±10 rpm according to De Mattia flex fatigue test of JIS K6260 using the aforementioned vulcanized molded article. A case where the number of times was 2500000 times or more was evaluated as "A", a case where the number of times was 2000000 times or more and less than 2500000 times was evaluated as "B", a case where the number of times was 1500000 times or more and less than 2000000 times was evaluated as "C", and a case where the number of times was less than 1500000 times was evaluated as "D". "A", "B", or "C" was evaluated as "passing".

[Oil Resistance]

The oil resistance was measured according to JIS K6258 using the aforementioned vulcanized molded article. The oil type employed was IRM903 oil, and the volume change rate (ΔV) after immersion for 72 hours at 135° C. was calculated. In a case where the volume change rate was less than 20% was evaluated as "A", a case where the volume change rate From the results presented in Table 1, it was found that, by using the polymer compositions of Examples, the breaking strength, the oil resistance, the fatigue durability, and the cold resistance in the vulcanized molded article are improved. Since this vulcanized molded article has these properties, the vulcanized molded article can be suitably used as a molded article such as a vibration-proof material and an air spring.

Experiment B: Evaluation of Polymer Composition (Production of Polymer Composition)

100 parts by mass of a polymer presented in Table 2, 1 part by mass of trimethyl thiourea (manufactured by OUCHI SHINKO CHEMICAL INDUSTRIAL CO., LTD., NOCCELER TMU), 1 part by mass of 4,4'-dithiodimorpholine (manufactured by OUCHI SHINKO CHEMICAL INDUSTRIAL CO., LTD., VULNOC R), 1 part by mass of stearic acid (manufactured by New Japan Chemical Co., Ltd., STEARIC ACID 50S), 2 parts by mass of octylated diphenylamine (manufactured by OUCHI SHINKO CHEMICAL INDUSTRIAL CO., LTD., NOCRAC AD-F), 40 parts by mass of carbon black FEF (manufactured by Asahi Carbon Co., Ltd., Asahi #60), 5 parts by mass of dioctyl sebacate (manufactured by New Japan Chemical Co., Ltd., SANSO CIZER DOS), 4 parts by mass of magnesium oxide (manufactured by Kyowa Chemical Industry Co., Ltd., KYOWAMAG 150), 5 parts by mass of zinc oxide (manufactured by SAKAI CHEMICAL INDUSTRY CO., LTD., Zinc Oxide No. 2), and 0.5 parts by mass of tetramethylthiuram disulfide (manufactured by OUCHI SHINKO CHEMICAL INDUSTRIAL CO., LTD., NOCCELER TT) were kneaded with an 8-inch open roll, thereby obtaining a polymer composition.

(Production and Evaluation of Vulcanized Molded Article)

The aforementioned polymer composition was subjected to press vulcanization under a condition of 160° C.×20 minutes to produce a sheet-shaped vulcanized molded article having a thickness of 2 mm. The same breaking strength, fatigue durability, oil resistance, and cold resistance as those in Experiment A mentioned above, except the evaluation criteria of cold resistance, were evaluated for this vulcanized molded article. In the evaluation of cold resistance, a case where T10 was −20° C. or lower was evaluated as "A", a case where T10 was higher than −20° C. and −10° C. or lower was evaluated as "B", and a case where T10 was higher than −10° C. was evaluated as "C". "A" or "B" was evaluated as "passing". Evaluation results are presented in Table 2.

TABLE 2

| | | Unit | Example | | | | | | Comparative Example | | | | |
|---|---|---|---|---|---|---|---|---|---|---|---|---|---|
| | | | B1 | B2 | B3 | B4 | B5 | B6 | B1 | B2 | B3 | B4 | B5 |
| Properties of Polymer | Polymer No. | — | 1 | 2 | 3 | 4 | 5 | 6 | 7 | 8 | 9 | 10 | 11 |
| | Amount of structural unit derived from unsaturated nitrile monomer | phr | 10 | 10 | 10 | 10 | 3 | 20 | 0 | 10 | 10 | 2 | 25 |
| | 1H-NMR peak area ratio (A/B) | % | 0.6 | 0.6 | 0.6 | 1.1 | 0.6 | 0.6 | 0.6 | 0.5 | 1.2 | 0.6 | 0.6 |
| | 1H-NMR peak area ratio (C/B) | % | 0.01 | 0.03 | 0.5 | 0.01 | 0.01 | 0.01 | 0.01 | 0.01 | 0.01 | 0.01 | 0.01 |
| Physical properties | Breaking strength | | A | A | B | A | B | A | A | C | A | B | A |
| | Fatigue durability | | B | A | A | C | B | B | C | B | D | C | C |
| | Oil resistance | | A | A | A | A | B | A | C | A | A | C | A |
| | Cold resistance | | A | A | A | A | A | B | A | A | A | A | C |

From the results presented in Table 2, it was found that, by using the polymer compositions of Examples, the breaking strength, the oil resistance, the fatigue durability, and the cold resistance in the vulcanized molded article are improved. Since this vulcanized molded article has these properties, the vulcanized molded article can be suitably used as a molded article such as a transmission belt and a conveyor belt.

The invention claimed is:

1. A chloroprene-unsaturated nitrile copolymer comprising 3 to 20% by mass of a structural unit derived from an unsaturated nitrile monomer, wherein
the chloroprene-unsaturated nitrile copolymer comprises a peak at 5.80 to 6.00 ppm in a 1H-NMR spectrum as measured in a deuterochloroform solvent, and
a ratio (A/B) of a peak area (A) at 5.80 to 6.00 ppm and a peak area (B) at 4.05 to 6.20 ppm is 0.6/100 to 1.1/100; wherein
the peak at 5.80 to 6.00 ppm represents a peak derived from vinyl hydrogen atoms of the 1,2-isomer of the chloroprene linking unit in the copolymer, and the peak at 4.05 to 6.20 ppm represents a peak derived from vinyl hydrogen atoms of the chloroprene structural unit in the copolymer.

2. The chloroprene-unsaturated nitrile copolymer according to claim 1, wherein
the chloroprene-unsaturated nitrile copolymer further comprises a peak at 4.13 to 4.23 ppm in a 1H-NMR spectrum as measured in a deuterochloroform solvent, and
a ratio (C/B) of a peak area (C) at 4.13 to 4.23 ppm and a peak area (B) at 4.05 to 6.20 ppm is 0.03/100 to 0.5/100.

3. A chloroprene-unsaturated nitrile copolymer composition comprising the chloroprene-unsaturated nitrile copolymer according to claim 1, and an additive other than the chloroprene-unsaturated nitrile copolymer.

4. A vulcanized molded article of the chloroprene-unsaturated nitrile copolymer according to claim 1.

5. The chloroprene-unsaturated nitrile copolymer according to claim 1, wherein the chloroprene-unsaturated nitrile copolymer comprises a structural unit derived from acrylonitrile.

6. The chloroprene-unsaturated nitrile copolymer according to claim 1, wherein the chloroprene-unsaturated nitrile copolymer comprises 9 to 17% by mass of the structural unit derived from an unsaturated nitrile monomer.

7. The chloroprene-unsaturated nitrile copolymer according to claim 1, wherein an amount of a structural unit derived from a chloroprene monomer is 83 to 91% by mass.

8. The chloroprene-unsaturated nitrile copolymer according to claim 1, wherein the ratio (A/B) is 0.6/100 to 0.9/100.

9. The chloroprene-unsaturated nitrile copolymer according to claim 1, wherein
the chloroprene-unsaturated nitrile copolymer further comprises a peak at 4.13 to 4.23 ppm in a 1H-NMR spectrum as measured in a deuterochloroform solvent, and
a ratio (C/B) of a peak area (C) at 4.13 to 4.23 ppm and a peak area (B) at 4.05 to 6.20 ppm is 0.03/100 or less.

10. The vulcanized molded article according to claim 4, which is a transmission belt.

11. The vulcanized molded article according to claim 4, which is a conveyor belt.

12. The vulcanized molded article according to claim 4, which is an air spring.

13. The vulcanized molded article according to claim 4, which is a vibration-proof material.

14. The chloroprene-unsaturated nitrile copolymer according to claim 1, wherein the chloroprene-unsaturated nitrile copolymer comprises 5% by mass or more and less than 20% by mass of the structural unit derived from an unsaturated nitrile monomer.

15. The chloroprene-unsaturated nitrile copolymer according to claim 1, wherein an amount of a structural unit derived from a chloroprene monomer is more than 80% by mass and 95% by mass or less.

16. The chloroprene-unsaturated nitrile copolymer according to claim 1, wherein the chloroprene-unsaturated nitrile copolymer comprises 5 to 17% by mass of the structural unit derived from an unsaturated nitrile monomer.

17. The chloroprene-unsaturated nitrile copolymer according to claim 1, wherein an amount of a structural unit derived from a chloroprene monomer is 83 to 95% by mass.

* * * * *